United States Patent [19]

Schnurr

[11] 4,280,020
[45] Jul. 21, 1981

[54] RADIO TELEPHONE SYSTEM WITH DIRECT DIGITAL CARRIER MODULATION FOR DATA TRANSMISSION

[75] Inventor: Lewis E. Schnurr, Harlow, England

[73] Assignee: Essex County Council, Chelmsford, England

[21] Appl. No.: 2,189

[22] Filed: Jan. 9, 1979

[51] Int. Cl.³ .............................................. H04Q 7/04
[52] U.S. Cl. ................................. 179/2 EA; 455/102
[58] Field of Search ........... 179/2 EA, 2 EB; 325/53, 325/55, 64; 455/28, 68, 102

[56] References Cited

U.S. PATENT DOCUMENTS

| | | | |
|---|---|---|---|
| 2,159,647 | 5/1939 | Alford | 455/102 |
| 3,716,790 | 2/1973 | Romoser | 179/2 EB |
| 3,806,663 | 4/1974 | Peek et al. | 179/2 EB |

FOREIGN PATENT DOCUMENTS

| | | |
|---|---|---|
| 563076 | 7/1944 | United Kingdom . |
| 605396 | 7/1948 | United Kingdom . |
| 614572 | 12/1948 | United Kingdom . |
| 694017 | 8/1953 | United Kingdom . |
| 894988 | 4/1962 | United Kingdom . |
| 1449953 | 9/1976 | United Kingdom . |

Primary Examiner—John H. Wolff
Assistant Examiner—Joseph A. Popek
Attorney, Agent, or Firm—Kemon & Estabrook

[57] ABSTRACT

In a method of transmitting data and speech signals over a telephone system through which communication is effected via a radio link, the data and the speech signals are separated in the frequency domain, and are transmitted in respective separate sideband channels. The data sideband channel contains sidebands generated by time coding an otherwise continuous wave signal. The latter signal may be a carrier signal which is modulated to convey the speech signals.

7 Claims, 2 Drawing Figures 4,280,020

RADIO TELEPHONE SYSTEM WITH DIRECT DIGITAL CARRIER MODULATION FOR DATA TRANSMISSION

BACKGROUND OF THE INVENTION

This invention relates to telephone systems in which communication is effected via a radio link.

The provision of telephone communication by radio is a standard facility provided by a number of developed countries. However, connections between subscribers are generally manually made and monitored by an intervening operator. Efforts have been made to provide automatic access to and from a public automatic switched network, but reliable operation demands absolute integrity of establishing, maintaining and subsequently releasing the connection irrespective of signal fluctuations or the presence of noise in the radio channel. The known techniques rely on the transmission of coded tones to provide the control signals associated with the connection to and from the respective radio stations.

Known systems which enable direct connection with a switched telephone network use techniques which are similar to those commonly found in line communication. Whilst these techniques provide a working system, certain limitations inherent in their implementation preclude the optimum use of a radio link.

BRIEF SUMMARY OF THE INVENTION

The present invention provides a significant improvement in system operation due to an improved method of transmitting the data required to initiate, route and terminate automatic connection between telephone subscribers via a radio circuit.

According to the invention, a method of transmitting data and speech signals in a telephone system in which communication is effected via a radio link comprises separating the data and speech signals in the frequency domain and transmitting the data and speech signals in respective separate sideband channels, the data sideband channel containing sidebands generated by time coding an otherwise continuous wave signal.

The continuous wave signal may be the carrier wave used to convey the speech information.

By this method it is possible to utilise the maximum power transmitted by the system to convey the data, and if the data is of a rate similar to the conventional dial interruption rate, it is also possible to provide an optimally-filtered channel with a data signal-to-noise ratio at least two orders of magnitude greater than the best signal-to-noise ratio obtainable in a conventional radio speech channel using an equivalent carrier power.

This method of transmission also allows non-coherent detection to be used; for example envelope detection utilising the total transmitted power can provide optimum retrieval. The rapid random fading and destruction of phase coherence which result from propagation conditions commonly found in radio systems will not materially affect the detection fidelity.

Furthermore, since the data may be sent in a sub-band of the allocated system bandwidth which is not required to carry the frequencies used for the transmission of speech, the special discrimination circuitry which is required in conventional modulated carrier systems to separate the received data and speech becomes unnecessary when the present invention is used.

Optimum transmission and detection of the data signals may be effected with a minimum of analogue circuitry, and the use of digital processing results in economy of power consumption, size and cost of the equipment, and makes possible the use of a system incorporating miniature portable equipment.

DETAILED DESCRIPTION

The requirements dictated by switched-network originated calls and remote radio-initiated calls are as follows:

In switched-network originated calls the principal consideration is the speech quality which will prevail if the connection is made; hence signalling to the remote station is sensibly made by sending tones on the speech channel. If the signal-to-noise ratio is less than an acceptable level, the remote station will not be aware that it is being called, and an attempt to make a connection which would be of unsatisfactory quality is inhibited.

In remotely originated calls, consideration must be given to the unknown quality of the connection which might be made. In this case, the coded pulsed-carrier is received at the fixed location by circuits which discriminate between the pulses sent and the noise present in the channel. Using time-coincident "window" circuitry which inhibits signals outside the window, only the correct pulse structure, together with noise-free pulse intervals, will be accepted. This ensures that the remote station cannot seize exchange equipment unless the received signal-to-noise ratio is adequate for the interference-free transmission of dialling digits which must follow the initiation of the connection. Additional security, if required, may be obtained by storing the transmitted digits at the remote equipment and subsequently comparing the stored digits with the digits received after retransmission back to the remote station by the fixed station transmitter.

Figure 1:
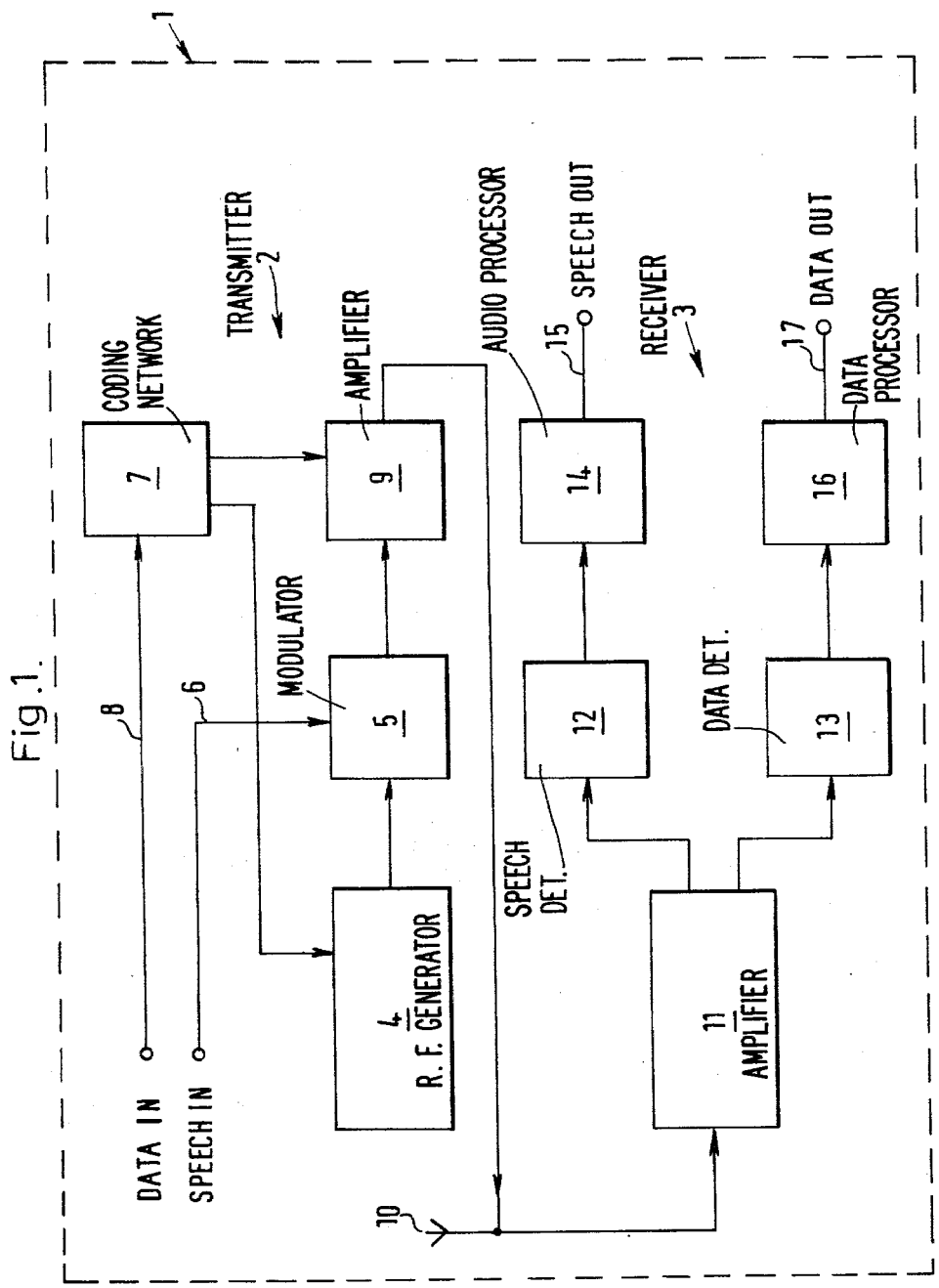
FIG. 1 is a block schematic diagram of a transmitter-receiver unit.

Referring to FIG. 1 of the drawings, a transmitter-receiver unit 1 comprises a transmitter section 2 and a receiver section 3.

The transmitter section 2 includes a radio-frequency generator 4 which feeds a carrier signal to a modulator 5. Audio-frequency signals are fed to the modulator 5 from an audio source (not shown) along a "speech in" line 6 to modulate the carrier linearly in accordance with the speech, following known speech transmission techniques. This modulation will produce sideband energy containing frequencies which are separated from the carrier frequency, the smallest separation being equal to the lowest speech signal frequency.

A coding network 7 receives data (supervisory signals) from a data source (not shown) along a "data in" line 8. The supervisory signals are required to establish, and subsequently release, the connection to a selected remote subscriber. The coding network 7 provides an output signal which is fed to the carrier signal generator 4 to time code the carrier signal in accordance with the data.

In a simple form of embodiment, the coding network 7 and the data source may together comprise a standard telephone dial which is wired to provide an off-normal current which is interrupted to produce a pulse train during its return to the rest position, the number of pulses in the train representing the data to be transmitted. In a more sophisticated arrangement, the data source and the network 7 may provide an encoded representation comprising a preamble indicating that data are about to be transmitted; the actual data; and a postamble indicating that the transmission of data has finished.

The time coding is effected by causing discrete changes in the amplitude or phase of the carrier signal, each discrete amplitude or phase state representing a different data code element. For example, the coding may be effected by the switching on and off of the carrier signal in accordance with the coded output signal from the network 7.

The switching of the carrier signal will produce sideband energy related to the supervisory data. The data rate is relatively slow, and will not normally exceed 250 bauds. This means that the frequencies in the supervisory signal sideband energy will be closer to the carrier frequency than the closest speech sideband frequency, and the transmitted supervisory signals will therefore not encroach on the transmitted speech signal frequencies.

The modulated carrier signal is fed by the modulator 5 to an amplifier 9 and thence to a combined transmit/-receive aerial 10.

The reciever section 3 comprises an amplifier 11 connected to the aerial 10 and including radio-frequency and intermediate-frequency amplifier stages with an associated local oscillator. Outputs from the amplifier 11 are fed to a speech detector 12 and a data detector 13. These detectors could alternatively be replaced by a single dual-purpose detector. The detected speech signals are then fed via an audio processor 14 to a "speech out" line 15. The detected data signals are similarly fed via a data processor 16 to a "data out" line 17.

Figure 2:
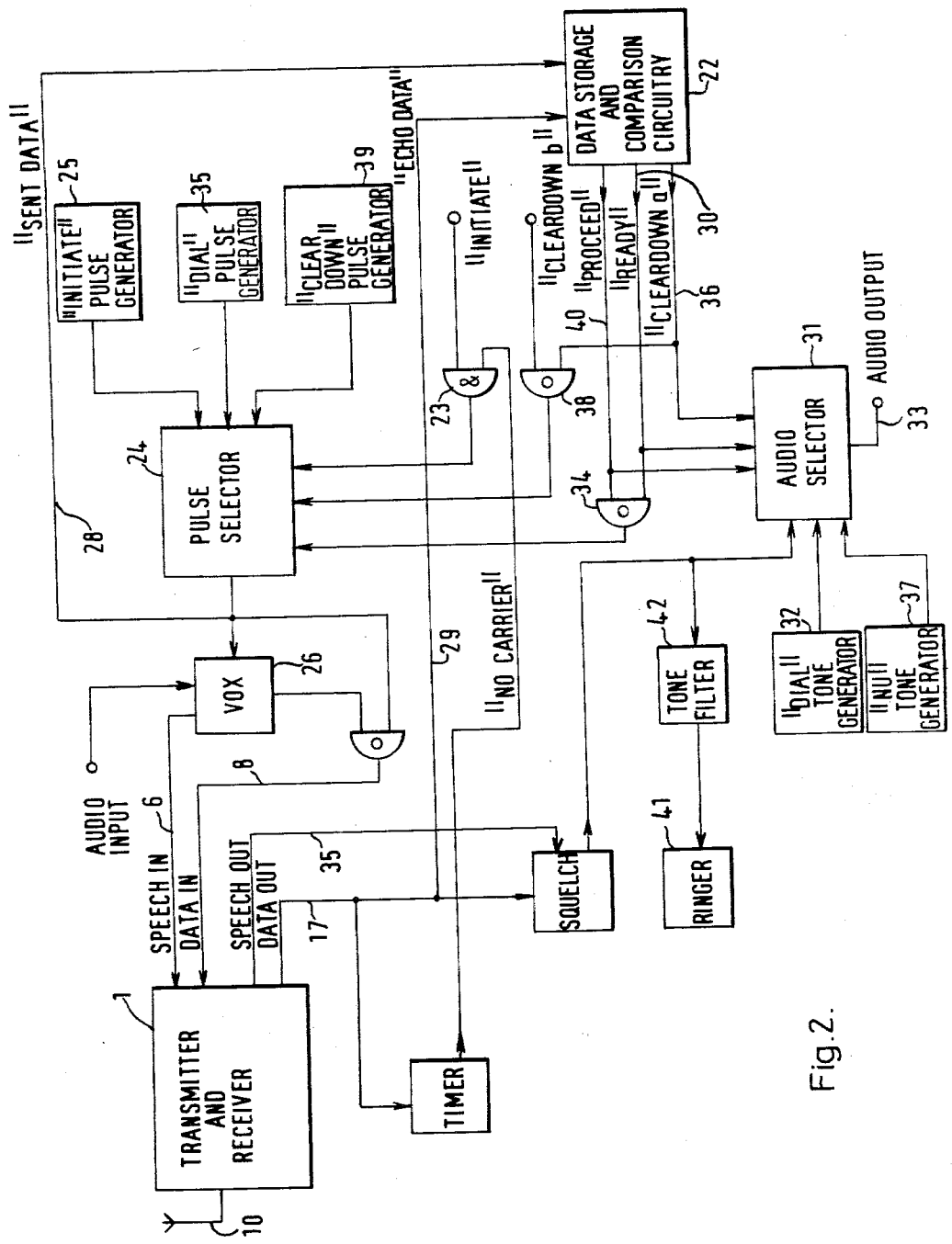
FIG. 2 is a block schematic diagram of a transmit/-receive station incorporating the unit of FIG. 1.

Referring now to FIG. 2 of the drawings, the speech output of the transmitter/receiver unit 1, in quiescent conditions, is ineffective, whilst the carrier output feeds to storage and comparison circuitry 22 and to an "initiate" signal gate 23 information relating to channel occupancy. If the channel is occupied by another signal, the "initiate" signal is inhibited.

Upon receipt of an "initiate" signal when the channel is unoccupied, a pulse selector 24 selects the output of an "initiate" pulse generator 25, and a low-speed pulse signature comprising a data-coded pulse train unique to the particular mobile station and having a low pulse frequency is fed to changeover circuitry 26. This signature is fed on the line 6 to the unit 1 and is transmitted thereby. The signature is also fed to the storage and comparison circuitry 22 over a line 28.

When the signature is received by the base station (not shown), it is retransmitted and is received by the unit 1, from which it is fed to the storage and comparison circuitry 22 over a line 29. The stored and received signatures are compared, and, if they correspond, a "ready" signal is fed, by the circuitry 22, over a line 30 to an audio selector 31. This selector passes a local "dial" tone from a generator 32 to an audio output 33. The "ready" signal is also fed via an OR-gate 34 to the selector 24 which selects the output of a "dial" pulse generator 35, allowing dialling to begin.

If the retransmitted signature does not agree with that sent, the circuitry 22 feeds a "cleardown a" signal to the selector 31 via a line 36. The selector 31 selects the output from a "number unobtainable" (NU) tone generator 37, and this tone is fed to the audio output 33. The "cleardown a" signal is also fed via an OR-gate 38 to the pulse selector 24, which therefore selects the output of a "cleardown" pulse generator 39. This pulse output is fed to the changeover circuitry 26. The "cleardown" pulse generator 39 continues to generate, and locally store, the cleardown signal until agreement of the transmitted and retransmitted signatures is obtained. The system then returns to idling.

If a "dial" tone is selected, dialling follows, and if at any time correspondence between the sent and retransmitted data compared by the circuitry 22 is lost, the cleardown sequence is initiated in the manner described above, and the "NU" tone is sent to the subscriber. If dialling tone is obtained, a "proceed" signal is fed from the circuitry 22 to the selector 24 via a line 40 and the gate 34, and allows the pulse selector to remain switched to the "dial" pulse generator 35. The "proceed" signal is also fed over the line 40 to the audio selector 31, which connects the receiver audio output to the subscriber in place of the local "dial" tone.

At the successful completion of the dialling sequence, an audio connection exists, and speech interchange between the stations may proceed in the normal way.

At the completion of the conversation, the subscriber feeds a "cleardown b" signal to the gate 38, which initiates the cleardown sequence described above.

If the remote station is called from the base station, audio tone selection is used and activates a ringer 41 via a tone filter 42 in the remote station.

The remote station apparatus shown in the drawing can be made quite small, and is very suitable for use as a portable (or "walk about") telephone.

What we claim is:

1. In an automatic telephone system in which communication is effected by transmission of signals via radio link, a method of transmitting speech signals together with supervisory signals for supervising establishment and subsequent release of a connection to a selected subscriber comprising:

generating a carrier signal;
linearly modulating said carrier signal with the speech signals to produce speech-related sideband energy;
imposing the supervisory signals on said carrier signal so that a characteristic of said carrier signal assumes a plurality of discrete states to represent the supervisory signals at a low baud rate thereby producing supervisory signal related sideband energy containing frequencies all of which are closer to the frequency of said carrier signal than are the frequencies in the speech-related sideband energy, whereby the supervisory signal-related sideband energy is entirely seperate in the frequency domain from said speech-related sideband energy; and
transmitting at least said sidebands via the radio link.

2. A method as claimed in claim 1, wherein the transmission of said speech-related sideband energy is inhibited during the transmission of said supervisory signal-related sideband energy.

3. A method as claimed in claim 1, wherein said characteristic is the amplitude of said carrier signal, and wherein said imposing of said supervisory signals on said carrier signal is effected by switching said carrier signal to a number of different peak amplitude values in accordance with said supervisory signals to be transmitted.

4. An automatic telephone system in which communication is effected by transmission of signals via a radio link, comprising means to generate a carrier signal;

means to produce speech signals;

means to modulate said carrier signal linearly with said speech signals to produce speech-related sideband energy;

means to produce supervisory signals for supervising establishment and subsequent release of a connection to a selected subscriber;

means to impose said supervisory signals on said carrier signal so that a characteristic of said carrier signal assumes a plurality of discrete states to represent said supervisory signals at a low baud rate thereby producing supervisory signal related sideband energy containing frequencies all of which are closer to said carrier frequency than are the frequencies in the speech-related sideband energy, whereby said supervisory signal-related sideband energy is entirely separate in the frequency domain from said speech-related sideband energy; and means to transmit at least said sidebands via said radio link.

5. Apparatus as claimed in claim 4, wherein said means to impose said supervisory signals on said carrier signal comprises means to key said carrier signal on and off in accordance with said supervisory signals.

6. Apparatus as claimed in claim 4, further comprising means to store supervisory signals as transmitted to a remote station;

means to receive return signals from said remote station;

means to compare said stored and return signals; and means to provide a "dial" tone if said stored and return signals correspond.

7. Apparatus as claimed in claim 6, further including means to provide a "number unobtainable" tone is said stored and return signals do not correspond.

* * * * *